(12) United States Patent
Janky et al.

(10) Patent No.: US 7,161,254 B1
(45) Date of Patent: Jan. 9, 2007

(54) METHODS AND SYSTEMS FOR HARNESSING ELECTRICAL ENERGY FROM AMBIENT VIBRATIONAL MOTION OF A MOVING VEHICLE

(75) Inventors: James M. Janky, Los Altos, CA (US); John Ahearn, Christ Church (NZ); Bruce Riter, Los Altos, CA (US)

(73) Assignee: Trimble Navigation Ltd., Sunnyvale, CA (US)

( * ) Notice: Subject to any disclaimer, the term of this patent is extended or adjusted under 35 U.S.C. 154(b) by 101 days.

(21) Appl. No.: 10/753,503

(22) Filed: Jan. 7, 2004

(51) Int. Cl.
*F02B 63/04* (2006.01)
(52) U.S. Cl. ..................................................... 290/1 R
(58) Field of Classification Search ................ 290/1 R; 180/165; 310/339
See application file for complete search history.

(56) References Cited

U.S. PATENT DOCUMENTS

| | | | | |
|---|---|---|---|---|
| 3,507,580 A | * | 4/1970 | Howard et al. | 417/231 |
| 3,805,083 A | * | 4/1974 | Demetrescu | 290/1 R |
| 4,005,319 A | | 1/1977 | Nilsson et al. | |
| 4,032,829 A | * | 6/1977 | Schenavar | 322/3 |
| 4,218,624 A | * | 8/1980 | Schiavone | 290/45 |
| 4,387,781 A | * | 6/1983 | Ezell et al. | 180/65.3 |
| 4,500,827 A | * | 2/1985 | Merritt et al. | 322/3 |
| 4,565,938 A | * | 1/1986 | Fawzy | 310/156.69 |
| 4,615,214 A | * | 10/1986 | Burns | 73/170.15 |
| 4,823,268 A | * | 4/1989 | Giles et al. | 701/50 |
| 5,001,488 A | * | 3/1991 | Joguet | 342/45 |
| 5,578,877 A | * | 11/1996 | Tiemann | 310/15 |
| 5,590,734 A | * | 1/1997 | Caires | 180/165 |
| 5,751,091 A | | 5/1998 | Takahashi et al. | |
| 6,069,420 A | * | 5/2000 | Mizzi et al. | 310/40 MM |
| 6,192,759 B1 | | 2/2001 | Schoess | |
| 6,841,970 B1 | * | 1/2005 | Zabramny | 320/101 |
| 6,847,126 B1 | * | 1/2005 | Adamson et al. | 290/1 R |
| 6,920,951 B1 | * | 7/2005 | Song et al. | 180/165 |
| 2003/0155827 A1 | * | 8/2003 | Cheung et al. | 310/90.5 |
| 2004/0139806 A1 | * | 7/2004 | Christmas | 73/862.041 |
| 2005/0093302 A1 | * | 5/2005 | Miyazaki et al. | 290/1 R |

OTHER PUBLICATIONS

Brian Urbanski,"Shake a Light Anyone?", www.edgereview.com,on line article, May 14, 2002, 2 pgs.

Rajeevan Amirtharajah et al., *Self-Powered Signal Processing Using Vibration-Based Power Generation*, IEEE Journal of Solid State Circuits, vol. 33 No. 5, May 1998, pp. 687-695.

Anurag Kasyap et al., *Energy Reclaimation from a Vibrating Piezoceramic Composite Beam*, Ninth International Congress on Sound and Vibration, ICSV9, University of Florida, Gainesville, FL USA 32611-6250, pp. 1-8.

Scott Meninger et al., *Vibration-to-Electric Energy Converstion*, IEEE Transactions on Very Large Scale Integration (VLSI) Systems, vol. 9, No. 1, Feb. 2001, pp. 64-76.

(Continued)

*Primary Examiner*—J Gonzalez
(74) *Attorney, Agent, or Firm*—Blakely, Sokoloff, Taylor and Zafman LLP

(57) ABSTRACT

Vibrational motion caused by a moving vehicle is transduced into electrical energy by a vibrational-to-electric energy converter, and stored in an electrical energy storage device such as a rechargeable battery. The electrical energy storage device may then power one or more electronic components located on the moving vehicle. Where a radio transmitter is used, information produced by the electronic components located on the moving vehicle may be transmitted to other locations/devices.

15 Claims, 4 Drawing Sheets

OTHER PUBLICATIONS

Shad Roundy et al., *Micro-Electrostatic Vibration-to-Electricity Converters*, Proceedings of IMECE2002 ASME International Mechanical Engineering Congress & Exposition, Nov. 17-22, 2002 New Orleans, Louisiana, pp. 1-10.

T. Sterken et al., *Power Extraction from Ambient Vibration*, IMEC VZW, Kapeldreef 75, 3001 Leuven, Belgium, KULeuven, ESAT-MICAS, Kasteelpark Arenberg 10, 3001 Leuven, Belgium, pp. 680-683.

Sang-Young Jung et al., *Performance Evaluation of Permanent Magnet Linear Generator for Charging Battery of a Mobile Apparatus*, School of Electrical Engineering Seoul National University, Seoul, 151-742, Korea, 6 pages.

*Quickpack Shunt Circuit Module*, ACX Active Control eXperts, Inc., 215 First Street, Cambridge, MA 02142, http:/www.acx.com, 1999, 2 pages.

\* cited by examiner

METHODS AND SYSTEMS FOR HARNESSING ELECTRICAL ENERGY FROM AMBIENT VIBRATIONAL MOTION OF A MOVING VEHICLE

FIELD OF THE INVENTION

The present invention relates to systems and methods for harnessing vibrational energy of a mast attached to a moving vehicle for use in powering electronic devices onboard the vehicle.

BACKGROUND

In 1995, Williams and Yates proposed an electromechanical generator to convert vibrational energy to electrical energy. C. B. Williams and R. B. Yates, "Analysis of a micro-electric generator for Microsystems," Proc. Transducers '95/Eurosensors IX, pp. 369–372 (1995) (incorporated herein by reference). As shown in FIG. 1, this generator consisted of a spring-mounted mass having a wire coil attached thereto. The free end of the spring was attached to a housing. Thus, when the housing vibrated the mass would oscillate so that the coil of wire would move through a magnetic field created by a permanent magnet positioned at the opposite end of the housing from which the spring-mounted mass was suspended. This caused an electrical current to be produced in the coil and a voltage was thereby available the output of the generator. Indeed, according to Williams and Yates, a device that measured 4 mm×4 mm×1 mm produced 0.3 µW of power (a power density of approximately 100 µW/cm$^3$).

In 1998, Amirtharajah and Chandrakasan showed that it would be possible to use the electromechanical generator of Williams and Yates to power a low-power digital electronic circuit. Rajeevan Amirtharajah and Anantha P. Chandrakasan, "Self-powered signal processing using vibration-based power generation," IEEE J. Solid-State Circuits, vol. 33, no. 5, pp. 687–695 (May 1998) (incorporated herein by refernce). The entire power supply system included no only the electromechanical generator, but also a voltage rectifier and regulator system. Generated power on the order of 400 µW (with a maximum output voltage of approximately 180 mV) was found to be feasible for a device measuring 4 cm×4 cm×10 cm.

Other methods to produce electrical energy from vibrational energy have also been discussed. For example, Meniger et al. described the use of a microelectromechanical systems technology (MEMS) variable capacitor to convert ambient mechanical vibration into electrical energy. Scott Meninger, et al., "Vibration-to-electric energy conversion," IEEE Trans. VLSI Systems, vol. 9, no. 1 pp. 64–76 (February 2001) (incorporated herein by reference). In this scheme, the vibrational energy was transduced through a MEMS capacitor etched on a silicon wafer. This device included a floating mass (free to move in one dimension), a folded spring (one per side) and two sets of interdigitated combs (one per side). As the mass oscillates, the interdigitated combs move together and apart, effectively varying the capacitance of the variable capacitor. This change in capacitance results in power being made available to an electronic circuit attached to the variable capacitor. In fact, Meninger et al. reported that up to 8.6 µW of power (3.8 µW/cm$^3$) would be expected from such a device that measured only 1.5 cm×1.5 cm.

Piezoelectric materials also offer opportunities to convert mechanical energy to electrical energy. For example, Kasyap et al. described an energy reclamation device that allowed electrical energy to be obtained from piezoceramic composite cantilever beams coupled to shunt circuits. Anurag Kasyap et al., "Energy reclamation from a vibrating piezoceramic composite beam" (incorporated herein by reference). This generator used an AC-to-DC flyback converter to provide an impedance match between the piezoelectric transducer and the output load, and to supply a DC voltage thereto.

Thus, it has been generally recognized that mechanical energy in the form of vibrational energy can be used as a power source for producing electrical energy. Aside from not-yet-realized, human-wearable computer systems, however, there seems to have been little or no discussion of applications for such technologies. This may be due, in part, to the relatively small amounts of power that have been generated using such systems.

SUMMARY OF THE INVENTION

In one embodiment, the present invention provides a vibration-to-electric energy converter mounted to a mast that is attached to a moveable vehicle. An electrical energy storage device (such as a rechargeable battery and/or capacitor) is coupled to receive and store electrical energy produced by the mast-mounted vibration-to-electric energy converter. An electronics package (such as a radio transmitter, GPS receiver, wind speed/direction indicator, laser receiver, etc.) may then be coupled so as to be powered by the electrical energy storage device. The vibrational-to-electric energy converter may include a generator having a permanent magnet (such as a linear or toroidal permanent magnet generator), or may be any of a variety of other forms of devices (e.g., a MEMS device, an inertial electromechanical generator, or a piezoelectric transducer). In operation, vibrational motion caused by the moving vehicle is transduced into electrical energy by the vibrational-to-electric energy converter, and the electrical energy storage device is then used to store the electrical energy produced by the vibrational-to-electric energy converter. The electrical energy storage device may then power one or more electronic components located on the moving vehicle. Where a radio transmitter is used, information produced by the electronic components located on the moving vehicle may be transmitted to other locations/devices.

BRIEF DESCRIPTION OF THE DRAWINGS

The present invention is illustrated by way of example, and not limitation, in the figures of the accompanying drawings in which.

DETAILED DESCRIPTION

Described herein are systems and methods for harnessing vibrational energy of a mast attached to a moving vehicle for use in powering electronic devices onboard the vehicle. Although these systems and methods will be discussed with respect to various illustrated embodiments, however, it should be remembered that these descriptions are but examples of the present invention and the full nature and scope of the invention should be measured only by the claims that follow this description. For example, much of the discussion herein relates to the use of the present invention with mast-mounted equipment. It is also the case, however, that diesel engines typically used on industrial equipment and boats tend to induce vibration in the body of the vehicle so that power generation derived from harnessing vibrational energy in accordance with the present invention can occur even when the vehicle is at rest with the engine idling. The present invention also finds particular application in environments where other forms of power generation are unsuitable. For example, solar panels are unsuitable in dusty or salt-water environments for obvious reasons. The present invention, however, may be used in these and other environments.

Figure 1:
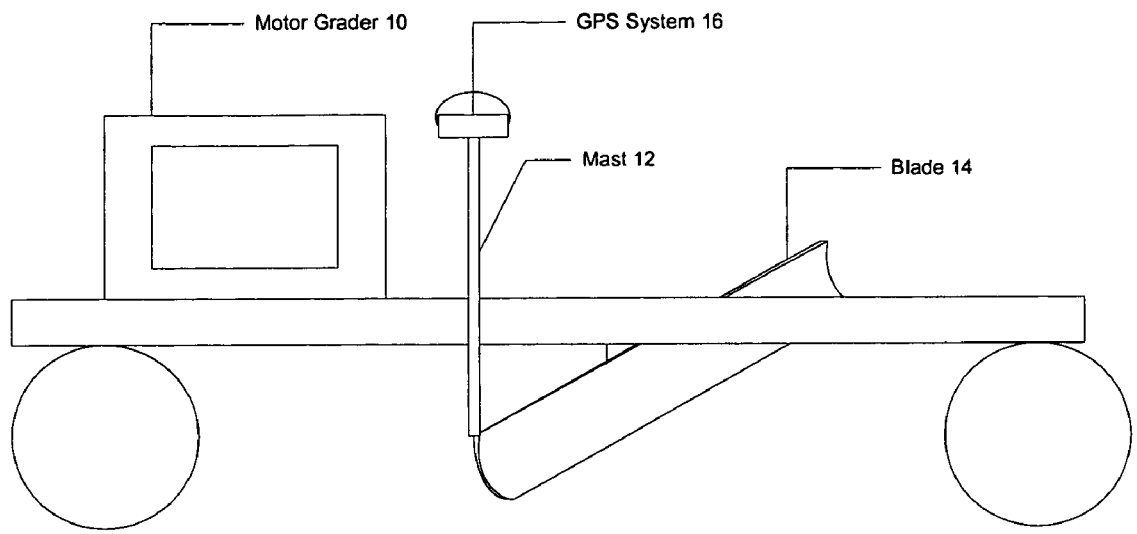
FIG. 1 illustrates a motor grader fitted with a mast-mounted GPS receiver system powered by a power supply having a vibrational-to-electric energy transducer configured in accordance with an embodiment of the present invention.

With the foregoing in mind, we now consider various aspects of the present invention. Many moving vehicles incorporate or have associated therewith one or more masts. These masts may be of varying length, cross-section and/or diameter, and all may generally be considered levers with one end secured to the vehicle (e.g., cantilevers). Examples of such masts include radio and other antennas for automobiles, boats and ships, and, of particular interest to the present invention, masts that support global positioning system (GPS) antennas/systems used by tractors, bulldozers, motor graders and other forms of agricultural and/or construction equipment. An example of this latter form of mast may be seen in FIG. 1, which illustrates a motor grader 10 having mast 12 attached to an end of its blade 14. Attached to the top of the mast 12 is a GPS antenna/receiver system 16. The GPS system 16 allows the operator of the motor grader 10 to very precisely determine the position and elevation of the motor grader's blade 14, which information is needed to accurately grade landscapes in accordance with construction plans. In other applications, this mast is attached to the top of the body of the motor grader, delivering a position fix of the motor grader body only.

As might be expected, the mast 12 attached to the motor grader blade 14 is subject to a significant amount of movement (often in the form of vibrational motion) when the motor grader 10 is in motion. In accordance with the present invention, this vibrational motion of the mast 14 (and the associated electronics package of which the GPS system 16 is an example) can be used to generate electrical power that can be used to power the GPS system 16 or other electronic equipment onboard the motor grader 10. In some cases, the electrical power generated as a result of harnessing the vibrational motion of the mast, etc., may be stored in an electrical storage device (such as a rechargeable battery or a large capacitor). The electronic systems may then be powered from this energy storage device rather than (or in addition to) directly from a vibrational-to-electric energy generator.

To understand why it is desirable to provide this form of energy source one must recognize that presently (i.e., in the absence of the present invention) the GPS system 16 and other electronic systems associated with the motor grader 10 must be powered either by a self-contained battery supply or from the motor grader's on-board generator. In the former case, these batteries must be periodically replaced, making their use somewhat inconvenient for the operator. In the latter case, the cables connecting the GPS system 16 and/or other electronic components to the generator are exposed, meaning that they can be easily cut or damaged during the normal operating activities of the motor grader 10. In such cases, the motor grader 10 must be taken out of service until repairs are completed, making this an even more inconvenient installation for the operator. In contrast, by providing a self-contained vibrational-to-electric energy generator, the present invention ensures that there are no exposed cables to be cut or damaged and no batteries that require frequent replacement.

Figure 2:
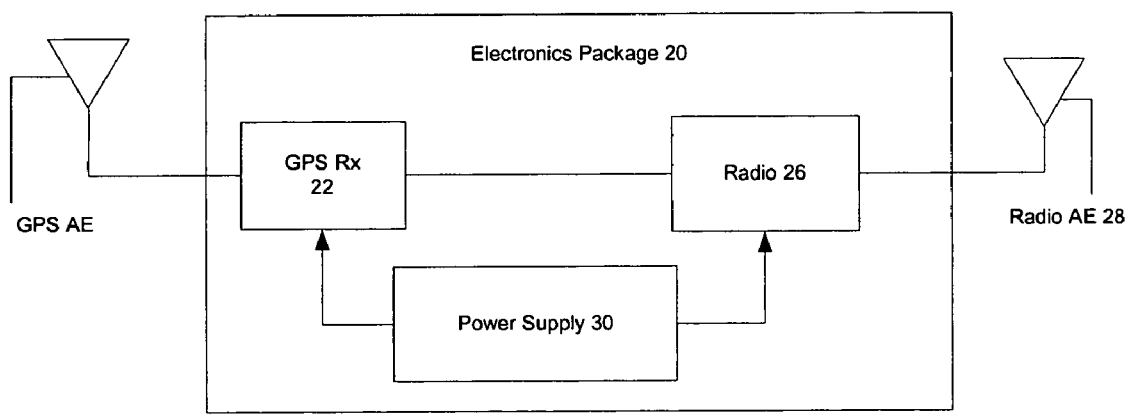
FIG. 2 illustrates an example of an electronics package powered by a power supply having a vibrational-to-electric energy transducer configured in accordance with an embodiment of the present invention.

Referring now to FIG. 2, an example of an electronics package 20 (e.g., a GPS antenna/receiver system with an associated radio transmitter) configured according to one embodiment of the present invention is shown. Although the electronics package 20 is discussed using the example of a GPS system, it should be remembered that the present invention may be used in conjunction with any electronics package that can be mounted on the vehicle/mast assembly. For example, rather than (or in addition to) a GPS system, a sailboat or other vehicle might make use of electronic wind speed and direction indicating equipment.

In the illustrated embodiment, however, the electronics package 20 includes a GPS receiver 22 having an associated antenna 24, a radio transmitter or transceiver 26 having its associated antenna 28, and a power supply 30. As will be discussed further below, the power supply 30 may include a rechargeable battery (e.g., a NiMH or NiCad battery) or other form of energy storage device (e.g., a capacitor or similar device). By including the power supply 30 within the electronics package 20 (or immediately adjacent thereto), the need for long cable runs connecting the electronics package 20 to a power source is eliminated. The rechargeable battery also provides a power source that is less volatile in its output characteristics than might otherwise be achievable using just a vibrational-to-electric energy generator and therefore helps to protect the electronic components against power surges and the like.

In other embodiments, electronic components such as the aforementioned wind speed/direction indicating equipment, a position/angle indicator sensor, and/or a laser receiver may be included in the electronics package 20 in addition to or in place of the GPS system. A laser receiver assembly may be particularly useful where the motor grader makes use of a laser-based elevation indication system in addition to or in place of a GPS receiver to accurately position its blade. In either instance, where a radio transmitter or transceiver 26 is used, any form of such a communication device may be used. For example the communications device may operate according to a communications protocol designed for short-range communications, such as the BLUETOOTH communications protocol and/or the 802.11a, b and/or g communication protocols. In other instances, the communications device may include a cellular or similar radio transceiver that is configured to operate in conjunction with one or more cellular or other wireless telecommunication networks. An example of such a network is the iDEN telecommunications network designed by Motorola, Inc. and used by Nextel Communications, among others, for voice and data transport. The idea behind incorporating a radio communications device in electronics package 20 is to eliminate the need for cables to transmit information obtained/produced by the GPS receiver 22 (or other electronics components) to the motor grader operator or other interested parties.

The electronics package 20 may be affixed to the motor grader mast by any convenient means. For example, the electronics package 20 may be mounted using detachable or weldable brackets, rivets, bolts, or other means for securing it to the mast. In still further embodiments, the electronics package 20 may be integrated as a component of the mast at time of the mast is manufactured, rather then being assembled and mounted to the mast thereafter.

Figure 3:
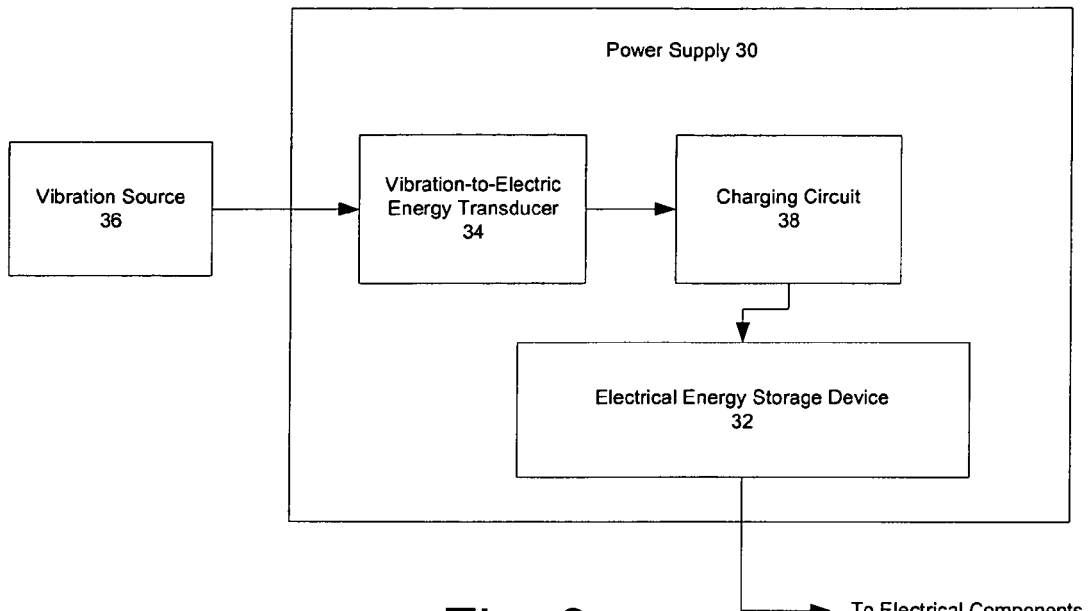
FIG. 3 illustrates an example of the power supply shown in FIG. 2 in greater detail.

Referring now to FIG. 3, a more detailed view of the power supply 30 is shown. Power supply 30 includes the energy storage device 32 (e.g., rechargeable battery and/or capacitor) discussed above as well as a vibrational-to-electric energy transducer 34. The transducer 34 converts vibrational energy received from a vibration source 36 (e.g., the motor grader mast or similar vibrational energy source) to electric energy. This electric energy is received by a charging circuit 38 coupled to the electrical energy storage device 32 and is used to charge that storage device 32.

The charging circuit 38 may be any conventional means for charging a rechargeable battery or capacitor (depending on the configuration of the electrical energy storage device 32), such as a voltage regulator and pulse width modulator. Charging may occur in discrete time intervals when the rechargeable battery or capacitor is not supplying power to the other electrical components. For example, in one embodiment of the present invention, a pair of rechargeable batteries is used as the energy storage device 32. While on of the batteries is being used to power the electronic components, the other may be recharged by the charging circuit 38. Upon completion or periodically according to a schedule, a handover may occur so that the battery which had been supplying power to the electronic components gets recharged and the formerly charging battery is used to power the electronic components. In other examples only a single battery or capacitor arrangement is used, but the electronic components are only operated for short duration time intervals so that recharging can be accomplished when the battery or capacitor is not powering the electronic components. Such may be the case when the electronic component is a radio transmitter/transceiver that only operates for short pulses.

As discussed above, several examples of vibrational-to-electric transducers 34 (and their associated power rectifiers, etc.) are described in the literature. Any of these forms of transducers may be used in conjunction with the power supply 30. In some cases, for example where the particular form of transducer only produces a minimal amount of electric energy, it may be necessary to combine multiple transducers by summing their electric outputs in order to obtain a useful amount of charging current for the present application. To recap, these transducers include the inertial electromechanical generator originally proposed by Williams and Yates and described in detail by Amirtharajah and Chandrakasan; the piezoceramic cantilever and AC-to-DC flyback converter described by Kasyap et al.; and the MEMS devices discussed by Meninger et al. A further review of such energy systems is presented in P. Glynne-Jones and N. M. White, "Self-powered systems: a review of energy sources," Sensor Review, vol. 21, no. 2, pp. 91–97 (2001) (incorporated herein by reference).

Figure 4:
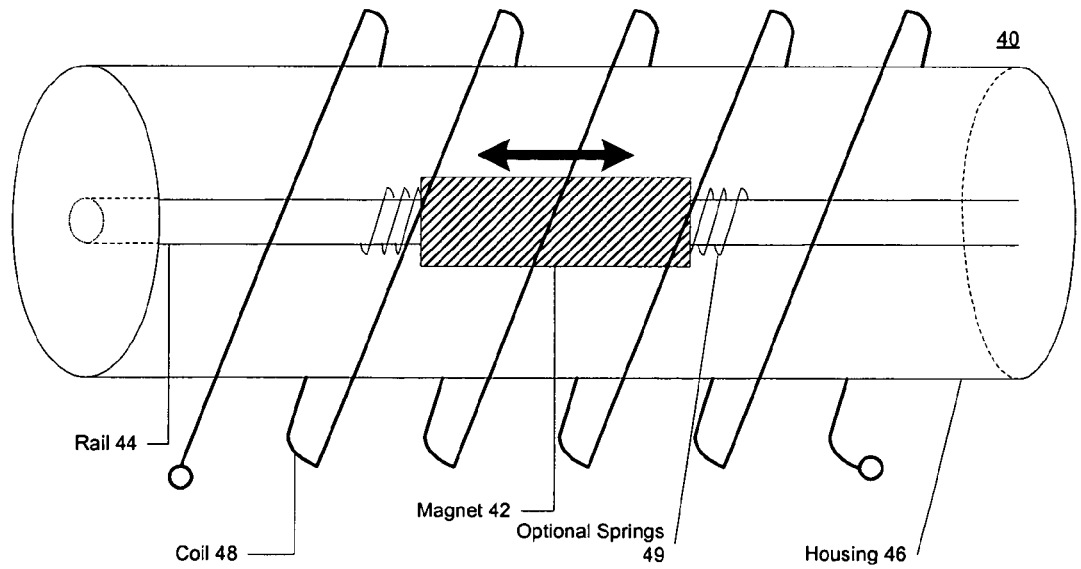
FIG. 4 illustrates an example of a linear permanent magnet generator configured in accordance with an embodiment of the present invention.

In addition to these forms of vibration-to-electric energy transducers, however, the present inventors have recognized some other useful devices. For example, as shown in FIG. 4, another transducer that may be used in connection with the present invention is a permanent magnet linear generator 40. This generator includes a permanent magnet 42 slidably mounted on a rail 44 within a housing 46. Surrounding the housing (or mounted inside thereof are one or more coils 48.

Such generators 40 may be mounted in one or more orientations about a central axis of the mast or other member so that when the mast vibrates (e.g., when the motor grader is moving), the permanent magnet 42 will oscillated within the housing. Because there is a magnetic field associated with this magnet 42, such motion will cause a varying amount of magnetic flux to cut across the turns of the coil 48 and induce a current therein in accordance with Faraday's law. This current can then be applied to the charging circuit for use in charging the energy storage device as described above.

Because of the intermittent nature of the vibration or linear motion at the end of the mast, it may be important to be able to return the moving permanent magnet back to a neutral resting position, so that new displacements always cause some motion in the opposite direction of the movement of the mast. This can be accomplished by adding a pair of optional return springs 49 to the permanent magnet 42. This is only necessary in the case of a linear transducer.

Figure 5:
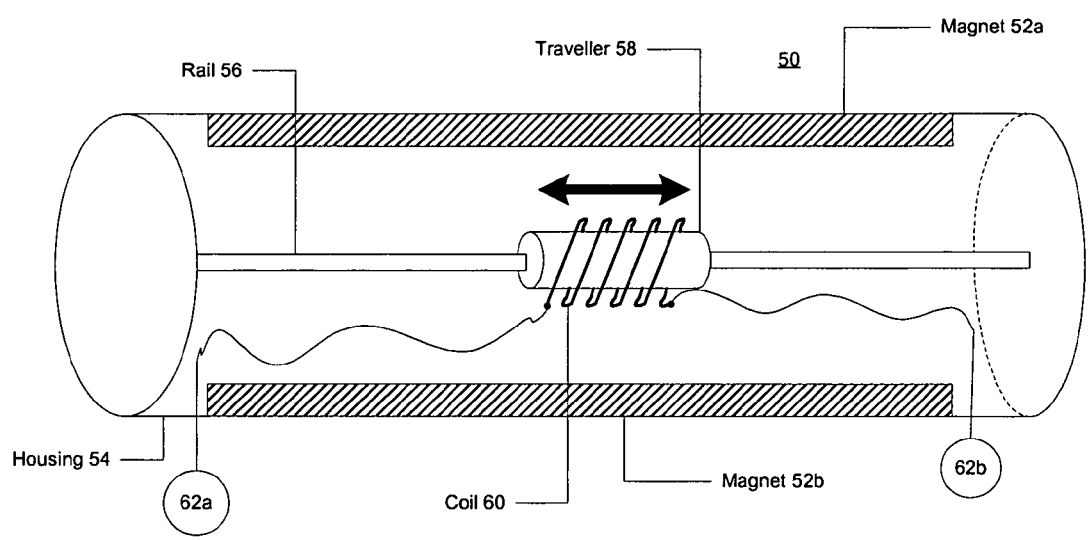
FIG. 5 illustrates another example of a linear permanent magnet generator configured in accordance with an embodiment of the present invention.

A variation of this type of linear generator is shown in FIG. 5. This time the generator 50 has two (or more) permanent magnets 52a and 52b located inside a housing 54 and mounted to opposite sides thereof. In some cases, a single magnet in the shape of a hollow cylinder may be used for this purpose. Suspended on a rail 56 within the housing 54 is a traveler 58 about which is wrapped a coil 60.

This time, as the mast vibrates the traveler 58 and the coil 60 will oscillate within the housing 54 causing the coil turnings to cut the magnetic flux created by the magnets 52a and 52b, again resulting in a current being induced in the coil 60. This current may be extracted at terminals 62a and 62b, which are coupled to the coil 60, so that the energy produced by the generator 50 can be applied to the charging circuit.

Figure 6:
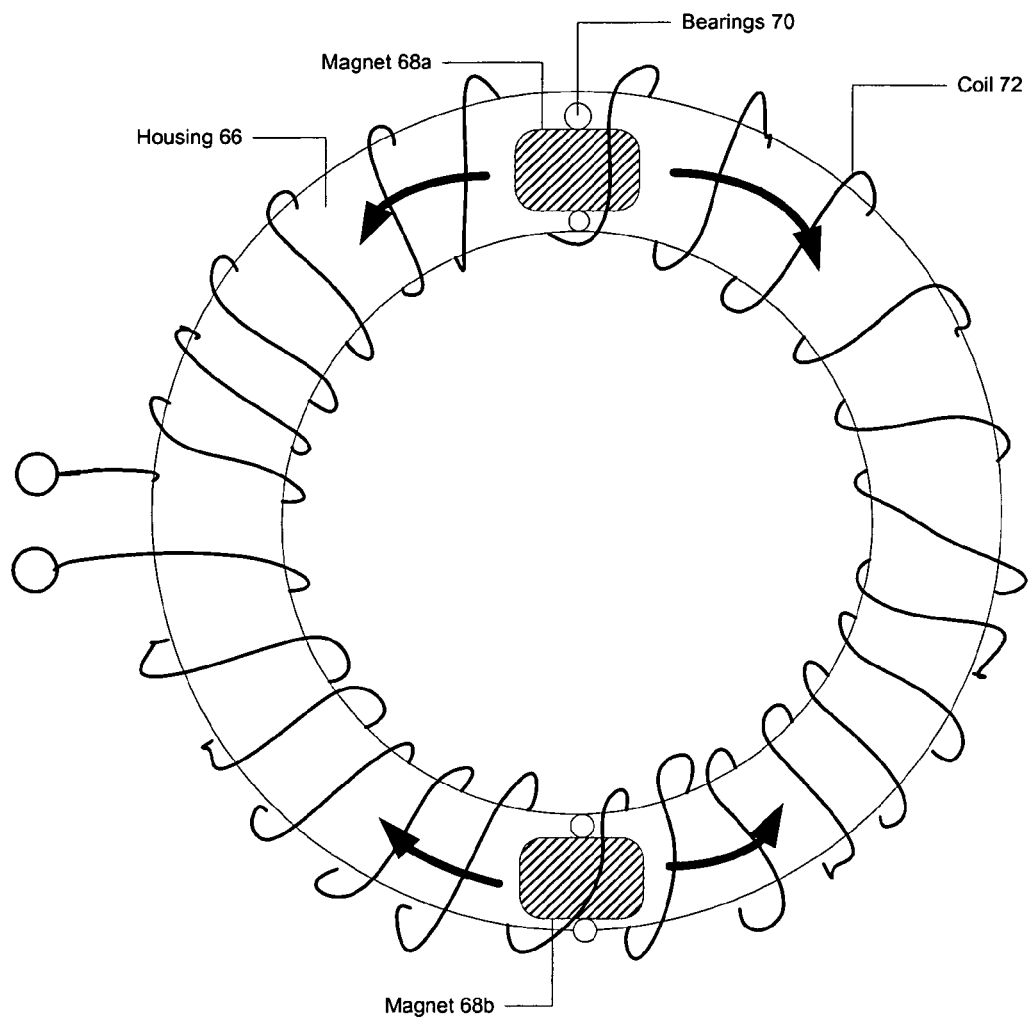
FIG. 6 illustrates an example of a toroidal permanent magnet generator configured in accordance with an embodiment of the present invention.

Rather than (or in addition to) the various forms of linear generators, a toroidal generator 64, an example of which is illustrated in FIG. 6, may be used as the vibrational-to-electric transducer. This generator 64 includes a hollow housing 66 in the shape of a toroid, in which are located one or more permanent magnets 68a, 68b, etc. The magnets 68 may be slidably suspended within the housing 66 through the use of bearings or other low friction devices 70 mounted within the housing 66. Alternatively, the interior of the housing may be coated with Teflon™ or other low friction coating so as to permit easy movement of the magnets 68 therein.

Wrapped about the housing 66 (or integrated therein), is a coil 72. Thus, when the magnets 68 move within the housing 68 (e.g., as a result of motion of the mast on which the transducer is mounted), the magnetic flux will cut the wrappings of the coil 72, inducing a current therein. This current can be supplied to the charging circuit for use in recharging the electric energy storage device.

Thus, systems and methods for harnessing vibrational energy of a mast attached to a moving vehicle for use in powering electronic devices onboard the vehicle have been described. Although these systems and methods were discussed with respect to various illustrated embodiments, it should be remembered that these descriptions are but examples of the present invention and the full nature and scope of the invention should be measured only by the claims that follow.

What is claimed is:

1. A system comprising a vibration-to-electric energy converter mounted to a mast that is attached to a moveable vehicle, and an electrical energy storage device coupled to the mast to receive and store electrical energy produced by the mast-mounted vibration-to-electric energy converter.

2. The system of claim 1, further comprising an electronics package coupled to be powered by the electrical energy storage device.

3. The system of claim 2, wherein the electronics package includes a radio transmitter.

4. The system of claim 2, wherein the electronics package includes a Global Positioning System (GPS) receiver.

5. The system of claim 4, wherein the electronics package further includes a radio transmitter coupled to the GPS receiver.

6. The system of claim 2, wherein the electrical energy storage device comprises a rechargeable battery.

7. The system of claim 2, wherein the electrical energy storage device comprises a capacitor.

8. The system of claim 2, wherein the electrical energy storage device comprises a pair of rechargeable batteries.

9. The system of claim 2, wherein the vibrational-to-electric energy converter includes a generator having a permanent magnet.

10. The system of claim 9, wherein the generator comprises a linear permanent magnet generator.

11. The system of claim 9, wherein the generator comprises a toroidal permanent magnet generator.

12. A method, comprising converting vibrational motion of a mast that is attached to a moving vehicle into electrical energy using a vibrational-to-electric energy converter, and charging an electrical energy storage device coupled to the mast using the electrical energy produced by the vibrational-to-electric energy converter.

13. The method of claim 12, further comprising powering one or more electronic components located on the moving vehicle from the electrical energy storage device.

14. The method of claim 13, further comprising transmitting information produced by the one or more electronic components located on the moving vehicle.

15. A system, comprising:

a mast attached to a vehicle;

a vibration-to-electric energy converter coupled to the mast and configured to produce electric energy in response to movement of the mast; and a electric energy storage device coupled to the mast to store the electric energy produced by the vibration-to-electric energy converter in response to movement of the mast.

* * * * *